United States Patent [19]

Yoshikawa

[11] Patent Number: 5,737,062
[45] Date of Patent: Apr. 7, 1998

[54] MONITORING APPARATUS OF FILM WITH MAGNETIC RECORDING PORTION IN CARTRIDGE

[75] Inventor: Tohru Yoshikawa, Wakayama, Japan

[73] Assignee: Noritsu Koki Co., Ltd., Umehara-Wakayama, Japan

[21] Appl. No.: 419,934

[22] Filed: Apr. 11, 1995

[30] Foreign Application Priority Data

Apr. 13, 1994 [JP] Japan ................. 6-074820

[51] Int. Cl.$^6$ .................. G03B 27/32; G03B 27/52
[52] U.S. Cl. ................. 355/40; 355/39; 396/319; 396/311
[58] Field of Search ................. 355/39, 40, 18; 396/311, 319, 320; 358/301, 302

[56] References Cited

U.S. PATENT DOCUMENTS

| | | | |
|---|---|---|---|
| 4,881,095 | 11/1989 | Shidara | 354/298 |
| 4,965,626 | 10/1990 | Robinson et al. | 355/40 |
| 4,974,096 | 11/1990 | Wash | 358/302 |
| 5,473,402 | 12/1995 | Long et al. | 354/298 |

*Primary Examiner*—R. L. Moses
*Attorney, Agent, or Firm*—Armstrong, Westerman, Hattori, McLeland & Naughton

[57] ABSTRACT

A film loading and unloading mechanism sends out a film from a cartridge in which a film with a magnetic recording portion is contained and rewinds the film. A magnetic information reading and writing mechanism reads information recorded in the magnetic recording portion of the film and may write change information in the magnetic recording portion. An image reading mechanism reads image information recorded in the film. An output device outputs both types of information. The magnetic data recorded on a film with a magnetic recording portion is read, and displayed on the monitor screen, allowing bit error and damage of magnetic data to be checked.

13 Claims, 2 Drawing Sheets

MONITORING APPARATUS OF FILM WITH MAGNETIC RECORDING PORTION IN CARTRIDGE

BACKGROUND OF THE INVENTION

The present invention relates to a monitoring apparatus of film with magnetic recording portion in a cartridge. More particularly, it relates to a monitoring apparatus capable of performing an accurate extra printing operation and an efficient printing operation, on the basis of various kinds of information read from a film having a magnetic recording portion contained in a cartridge.

A film in which optical and magnetic information is recorded is generally wound up in a cartridge so that the surface might not be damaged or bent, even after development, printing and extra printing. For such film contained in a cartridge, when extra printing is ordered again, the clerk at the photo shop manually writes the number of extra copies, change of print size, and other data on the DP service bag, exchange ticket, and price sheet.

Manual writing is, however, often accompanied by errors. Since the film is contained in the cartridge, it is very difficult to collate the specified frame and the printed frame after extra printing. Moreover, when receiving an extra printing order, it is hard to judge if the film has been developed or not from outside the cartridge, and therefore the undeveloped film brought in by the customer by mistake might be sensitized.

Further, if there is damage in the magnetic data recorded in the film, on every occasion of extra printing, the operator must carry out color correction by adjusting the light source, and it is hard to enhance the efficiency in extra printing operation.

In the light of the above-mentioned circumstance, it is hence a primary object of the present invention to provide a monitoring apparatus of film with magnetic recording portion in cartridge, capable of accepting the extra printing order quickly and accurately, and improving the efficiency of extra printing, in extra printing operation of film with magnetic recording portion in cartridge.

SUMMARY OF THE INVENTION

In accordance with the present invention, there is provided a monitoring apparatus of film with magnetic recording portion in cartridge comprising: a film loading and unloading mechanism for sending out a film from a cartridge in which the film with a magnetic recording portion is contained and rewinding the film; a magnetic information reading and writing mechanism for reading information recorded in the magnetic recording portion of the film and writing change information in the magnetic recording portion; an image reading mechanism for reading image information recorded in the film; an image device for displaying each information on a screen; and an output device for outputting each information.

It is preferable that the apparatus further includes a cleaning device for cleaning the surface of the film.

It is also preferable that the apparatus moreover includes infrared ray sensor for judging whether the film is developed or not.

The output device is preferably a printer for outputting index information.

The output device is preferably a printer for printing out predetermined items in at least one of a DP service bag, exchange ticket, and price sheet.

According to the monitoring apparatus of film with magnetic recording portion in cartridge of the present invention, the film contained in the cartridge is sent out frame by frame by the film loading and unloading mechanism, while the magnetic information and image recorded in the film are read by the magnetic information reading mechanism and image reading mechanism, respectively, and displayed in the image device. Therefore, while observing the monitor screen, the magnetic information data for extra printing can be confirmed, and any change or correction, can be written in the magnetic recording portion.

It is also possible to make an index print by manipulating the image device with observing the monitor screen, and the ID number and other necessary items might be printed out.

The film after finishing the information reading, writing, and printing can be rewound into the original cartridge.

DETAILED DESCRIPTION

Referring now to the accompanying drawings, a monitoring apparatus of film with magnetic recording portion in cartridge of the present invention (hereinafter referred to as "monitoring apparatus") is described in detail below.

Figure 1:
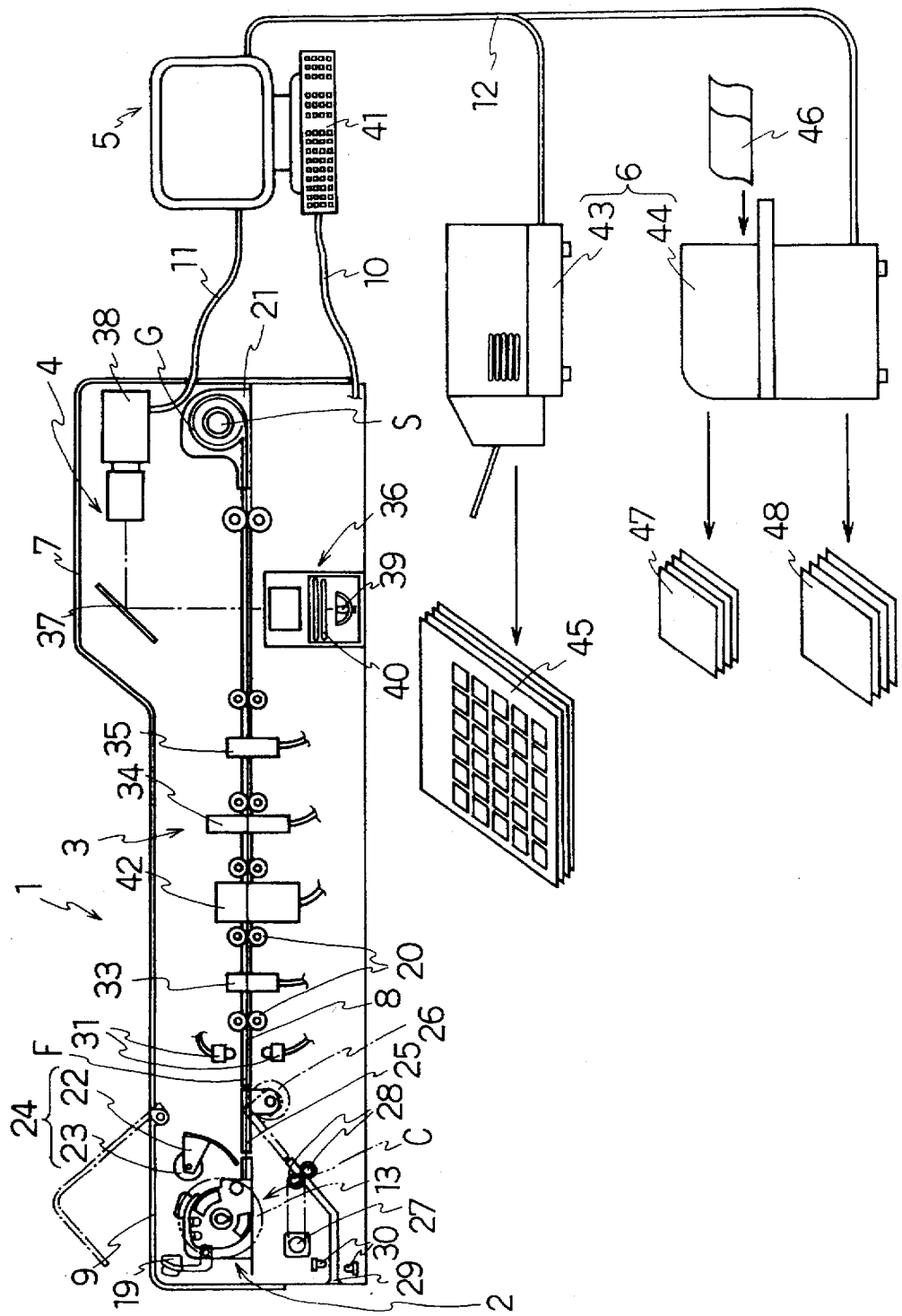
FIG. 1 is an explanatory view showing an embodiment of a monitoring apparatus of the present invention.
Figure 2:
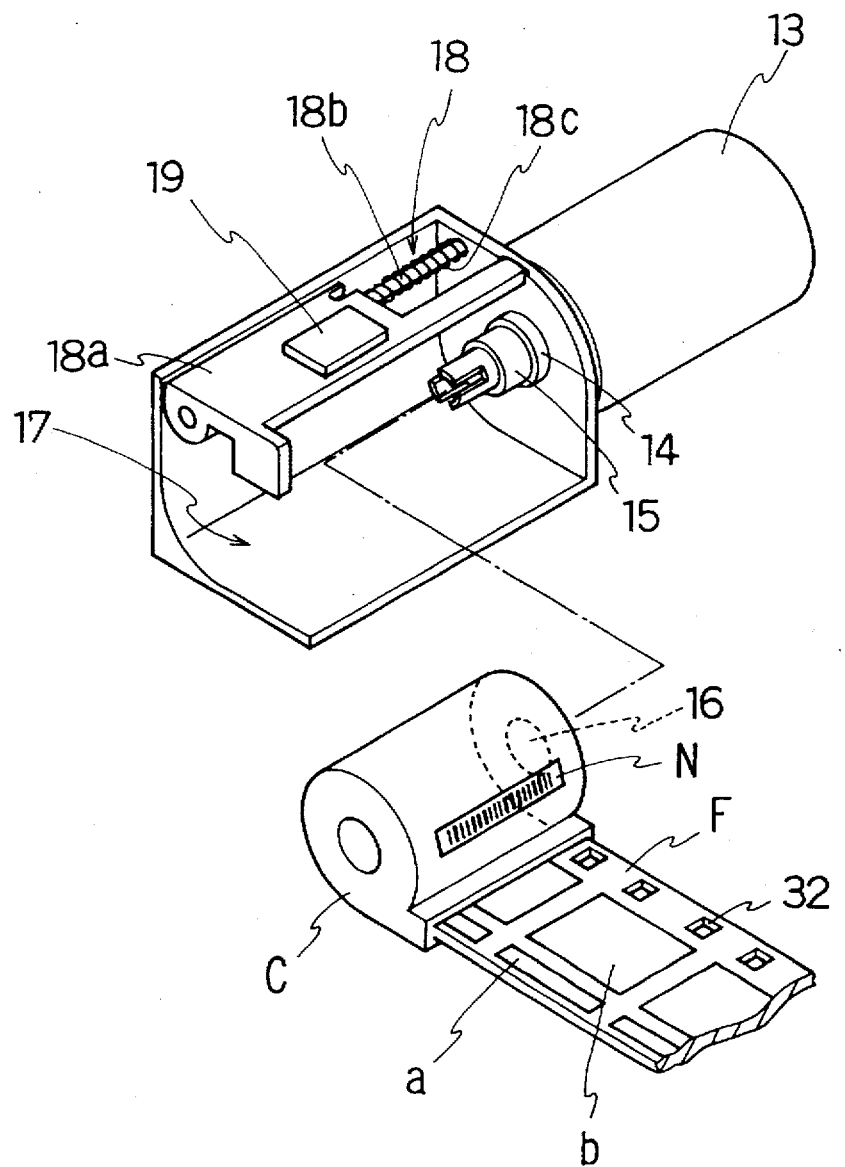
FIG. 2 is an explanatory view showing a film loading and unloading mechanism in FIG. 1.

FIG. 1 is an explanatory view showing an embodiment of a monitoring apparatus of the present invention, and FIG. 2 is an explanatory view showing a film loading and unloading mechanism in FIG. 1.

As shown in FIGS. 1 and 2, a developed film F having a magnetic recording portion a and an image b is contained in a cartridge C.

A monitoring apparatus 1 of the present invention comprises a film loading and unloading mechanism for sending out the film F from the cartridge C and rewinding the film, a magnetic information reading and writing mechanism 3 for reading the information recorded in the magnetic recording portion a and writing change information in the magnetic recording portion a, an image reading mechanism 4 for reading information of the image b recorded in the film F, an image device 5 for displaying each information on a screen, and an output device 6 for outputting each information.

The film loading and unloading mechanism 2, magnetic information reading and writing mechanism 3, and image reading mechanism 4 are sequentially disposed on a film travel guide 8 in a light-shielded box 7. The box 7 has a top cover 9 for putting in and out the film F in the upper part of the film loading and unloading mechanism 2.

The image device 5 and output device 6 are disposed outside the box 7.

Each mechanism is connected with the image device 5 through communication cables 10, 11. The image device 5 and output device 6 are connected with a communication cable 12 so as to realize output communication.

The film loading and unloading mechanism 2 comprises a motor 13 for sending out and rewinding the film F from and into the cartridge C. A coupling 15 with a bifurcated front end is attached to a rotary shaft 14 of the motor 13, and the coupling 15 and a spool 16 of the cartridge C are coupled together by the elastic force of the front end. By this coupling, the torque of the motor 13 is transmitted to the spool 16. The motor 13 is fixed at the side of a holder 17, and a spring mechanism 18 composed of a holder holder arm 18a, an arm shaft 18b, and a torsion spring 18c is mounted on the upper part of the holder 17 so as to hold the loaded cartridge C. At the front end of the holder arm 18a, moreover, a bar code detector 19 comprising CCD sensor, photo transistor or the like is disposed so as to read the ID number provided in the cartridge C shown in FIG. 2. The ID number includes the number and symbol intrinsic to the film and cartridge.

The film F being sent out from the film loading and unloading mechanism 2 is conveyed by a conveying roller 20, passes through the magnetic information reading and writing mechanism 3 and image reading mechanism 4, and is wound up in a different cartridge G by a film wind-up device 21 in the rear part (right side in FIG. 1) of the box 7. The film F being wound up is rewound into the cartridge C by reversely rotating and driving the spool S of the cartridge G and conveying roller 20.

When the ordered film F is returned as strip negative film, after information input, the film F wound up by the film wind-up device 21 is taken out again as mentioned above. Accordingly, in the upper part of the holder 17, there is provided a film removal mechanism 24 composed of a rear end removal guide 22 for taking out the film F from the cartridge C, and a removal solenoid 23 for inserting the front end of the guide 22 into the opening of the cartridge. After removing the rear end of the strip negative film, the film is conveyed by the conveying roller 20 to pass through the magnetic information reading and writing mechanism 3 and image reading mechanism 4, and is wound up in a different cartridge G by the film wind-up device 21 in the rear part (right side in FIG. 1) of the box. The film F being wound up is taken out from the cartridge G by reversely rotating and driving the spool S of the cartridge G and conveying roller 20. A turn guide 25 rotatably attached to the guide 8 is lowered by a turn solenoid 26, so that the strip negative film is taken out from an insertion port 29 by a conveying roller 28 which is driven by a motor 27. When the ordered film F is a strip negative film not contained in a cartridge, the film F is inserted from an insertion port 29, and is detected by a strip negative detection sensor 30. Thereafter, the turn guide 25 is lowered as mentioned above to convey the strip negative film into the film travel guide 8 to pass through the magnetic information reading and writing mechanism 3 and image reading mechanism 4 by the conveying roller 20, and is wound up by the film wind-up device 21 as mentioned above. After taking up, by reversely rotating and driving the spool S of the cartridge G and conveying roller 20, the strip negative film is taken out from the cartridge G, and is finally taken out from the insertion port 29 by the conveying roller 28 by way of the turn guide 25 of lowered state. Incidentally, the film brought in for extra printing might contain undeveloped frames. In such case, to prevent exposure by mistake, an infrared sensor 31 is provided to judge whether the film is developed or not. Near the film loading and unloading mechanism 2, moreover, a perforation detector 33 is disposed to detect tiny slots 32 provided in the end area of the film F in order to send out the images of the film F frame by frame. As this perforation detector 33, a light emitting diode and a photo transistor can be used.

The magnetic information reading and writing mechanism 3 comprises a magnetic head 34 disposed opposite to the film F, and reads the information of magnetic data such as print size, print magnification, and title message recorded in the magnetic recording portion a of the film F, or writes the print size, print magnification, or other changes (correction), number of extra prints, and others to input again in the magnetic recording portion a. In a relatively inexpensive photographic camera, the print size is not recorded as magnetic information, but holes are punched in the film. For such case, a hole punch detector 35 is provided for reading the hole punching.

The image reading mechanism 4 comprises a light source 36 disposed beneath the film F, and a CCD camera 38 for reading a frame image b of the film F projected from the light source 36 above the film F by reflecting the frame image b in the horizontal direction by a reflection mirror 37. The light source 36 comprises a light source lamp 39 and a shutter 40 driven by a solenoid on the light source lamp 39. The shutter 40 is manipulated to close when the film is not developed, whereby preventing exposure of undeveloped film. As the image reading mechanism 4, a line sensor camera using photo diode array can be used, instead of the CCD camera. Since the irradiation light from the light source lamp 39 is guided in the horizontal direction by the reflection mirror 37, the height of the monitoring apparatus 1 can be lowered as compared with the CCD camera 38 mounted above the light source lamp 39.

The image read by the CCD camera 38 is reproduced in the image device 5.

As the image device 5, any means capable of displaying picture as monitor TV might be used, including CRT, liquid crystal, LED, and plasma.

Thus, the image recorded in the film F is fed out frame by frame by film loading and unloading mechanism 2, and each image can be displayed on the monitor screen of the image device 5. Therefore by confirming each image, and manually inputting the extra printing information, for example, for the operator from a keyboard 41 into each image displayed on the monitor screen, such information is written into the predetermined magnetic recording portion a on the film F.

The print size and zoom factor as magnetic data recorded in the film F are also displayed, and hence bit error and damage in magnetic data can be checked. If damage is found in the magnetic data, for example, the condition necessary for printing can be inputted in the magnetic head 34 from the keyboard 41, so that the magnetic data can be changed and corrected in the predetermined magnetic recording portion a like in the above-mentioned case.

To display the image and magnetic data accurately on the monitor screen, it is preferred to dispose a cleaner device 42 for removing dust from the surface of the film F simultaneously when conveying the film F, at the front side (left side in FIG. 1) of the magnetic head 34.

As the output device 6, printers of thermal dye sublimation transfer type and dot impact type 43, 44 can be used. The thermal sublimation type printer 43 makes an index print 45 on the basis of the index information out of the printing information sent from the image device 5. This index print 45 has frame pictures of the film F printed sequentially on one print, and the specified extra printing frame is marked, so that it can be confirmed after extra printing.

The index print making method in the embodiment is not limited to the thermal dye sublimation transfer type alone, and the type using the image display of CRT or liquid crystal might be also employed.

The dot impact type printer 44 reads the ID number displayed in the cartridge C by means of a bar code detector 19, and prints the ID number on a DP service bag 46 or exchange ticket 47. Moreover, the date and time of reception, delivery time and others might be printed through input from the keyboard 41. Besides, the printer 44 calculates the price from the print size and number of prints of extra printing read by the magnetic head 34 or bar code detector 19, and prints the price on a price sheet 48.

As described above, according to the monitoring apparatus of the present invention, the magnetic data recorded on a film with magnetic recording portion is read, and displayed on the monitor screen, so that bit error and damage of magnetic data can be checked. If any damage is detected, change or correction can be inputted from the keyboard while observing the monitor screen, so as to be written in the magnetic recording portion of the predetermined frame. Besides, while observing the monitoring screen, the zoom factor for printing can be changed, or the title or message to be printed can be written easily in the magnetic recording portion.

When receiving an order for extra printing of a film contained in a cartridge, if there is no information for extra printing such as index print of the previous extra printing or sample of specified print, the index print wherein the number of extra copies for printing is inputted in the specified frame image can be made with observing the monitor screen. Accordingly, the extra printing operation can be carried out accurately, and the job efficiency can be enhanced.

Necessary items on the exchange ticket or price sheet conventionally written manually can be printed by the printer after confirming on the monitor screen, so that accurate and speedy entry is realized.

It has been hitherto difficult to confirm whether a film is developed or not, but it can be checked whether the frame is developed or not by an infrared ray sensor the instant film is sent out.

Still more, if there is only a mask exclusive for strip film negative, extra printing can be made.

Though several embodiments of the present invention are described above, it is to be understood that the present invention is not limited only to the above-mentioned and various changes and modifications may be made in the invention without departing from the spirit and scope thereof.

What is claimed is:

1. A monitoring apparatus of film, with a magnetic recording portion, in a cartridge comprising:

a film loading and unloading mechanism for sending out a film from a cartridge in which the film with a magnetic recording portion is contained and for rewinding the film;

a magnetic data reading and writing mechanism for reading magnetic data recorded in the magnetic recording portion of the film and writing magnetic data information in the magnetic recording portion;

an image reading mechanism for reading image information recorded in the film; and an image device for displaying magnetic data read by said magnetic data reading and writing mechanism and for displaying image information read by said image reading mechanism on a screen; wherein said image device displays the magnetic data and the image information simultaneously on the screen.

2. The monitoring apparatus of claim 1, wherein the apparatus further includes a cleaning device for cleaning the surface of the film.

3. The monitoring apparatus of any one of claims 1 or 2, wherein the apparatus further includes an infrared ray sensor for judging whether the film is developed or not.

4. The monitoring apparatus of any one of claims 1 or 2, further comprising:

a printer for outputting index information.

5. The monitoring apparatus of any one of claims 1 or 2, further comprising:

a printer for printing out predetermined items in at least one of a DP service bag, exchange ticket, and price sheet.

6. The monitoring apparatus of claim 3, further comprising:

a printer for outputting index information.

7. The monitoring apparatus of claim 3, further comprising:

a printer for printing out predetermined items in at least one of a DP service bag, exchange ticket, and price sheet.

8. The monitoring apparatus of claim 1, wherein said image device includes one of a cathode ray tube, a liquid crystal device, a light emitting diode device and a plasma device.

9. The monitoring apparatus of claim 4, wherein said printer prints an index print on the basis of information sent from said image device.

10. The monitoring apparatus of claim 1, further comprising:

an output device for outputting image information read by said image reading mechanism and for outputting magnetic data recorded in the recording portion of the film.

11. A monitoring apparatus of film, with a magnetic recording portion, in a cartridge comprising:

a film loading and unloading mechanism for sending out a film from a cartridge in which the film with a magnetic recording portion is contained and for rewinding the film;

a magnetic data reading and writing mechanism for reading magnetic data recorded in the magnetic recording portion of the film and writing magnetic data information in the magnetic recording portion;

an image reading mechanism for reading image information recorded in the film; and an image device for displaying magnetic data read by said magnetic data reading and writing mechanism and for displaying image information read by said image reading mechanism on a screen; wherein said magnetic data reading and writing mechanism reads and writes magnetic data of a print size, a print magnification or a title, the magnetic data later affecting a printing operation respectively regarding print size, print magnification or titling.

12. A monitoring apparatus of film, with a magnetic recording portion, in a cartridge comprising:

a film loading and unloading mechanism for sending out a film from a cartridge in which the film with a magnetic recording portion is contained and for rewinding the film;

a magnetic data reading and writing mechanism for reading magnetic data recorded in the magnetic recording portion of the film and writing magnetic data information in the magnetic recording portion;

an image reading mechanism for reading image information recorded in the film; and an image device for displaying magnetic data read by said magnetic data reading and writing mechanism and for displaying image information read by said image reading mechanism on a screen; wherein said printer marks a frame of the index print as a function of the magnetic data recorded in the magnetic recording portion of the film.

13. A monitoring apparatus of film, with a magnetic recording portion, in a cartridge comprising:

- a film loading and unloading mechanism for sending out a film from a cartridge in which the film with a magnetic recording portion is contained and for rewinding the film;
- a magnetic data reading and writing mechanism for reading magnetic data recorded in the magnetic recording portion of the film and writing magnetic data information in the magnetic recording portion;
- an image reading mechanism for reading image information recorded in the film;
- an image device for displaying magnetic data read by said magnetic data reading and writing mechanism and for displaying image information read by said image reading mechanism on a screen: and
- an output device for outputting image information read by said image reading mechanism and for outputting magnetic data recorded in the recording portion of the film, said output device outputs an index print including a plurality of frames, each frame corresponding to image information read by said image reading means, and outputs markings on one or more frames, corresponding to magnetic data recorded in the recording portion of the film.

* * * * *